April 5, 1949.  M. FISCHER  2,466,308

MANUALLY OPERATED MAGNETO FOR ANIMAL PRODS

Filed Nov. 10, 1947

INVENTOR.
MAX FISCHER
BY
Martin E. Anderson
ATTORNEY

Patented Apr. 5, 1949

2,466,308

UNITED STATES PATENT OFFICE 2,466,308

MANUALLY OPERATED MAGNETO FOR ANIMAL PRODS

Max Fischer, San Francisco, Calif.

Application November 10, 1947, Serial No. 785,170

7 Claims. (Cl. 171—209)

This invention relates to improvements in electric prod poles for use in slaughter houses and similar places.

In places where cattle are handled in large numbers, for example, in slaughter houses, some means must be provided for making the animals move without subjecting them to any undue pain and also in such a manner as not to injure the hide. It has been customary to employ animal prods comprising a pole having a sharp point at one end. However, such prods are highly undesirable and objectionable for many reasons and more particularly for the reason that they cause the animal an undue amount of pain and suffering.

It is the object of this invention to produce an animal prod of such construction that instead of penetrating the hide of the animal by means of a sharp point, the animal is subjected to a very localized electric shock.

This shock is sufficient to cause the animal to move, but does not injure the animal in any way, and the pain does not persist for any length of time.

Electric prods have been invented, but for some reason they have not come into extensive use.

It is the object of this invention to produce a prod of the type indicated which shall not require the use of an electric battery, but shall have an electric magneto connected therewith in such a way that it can be operated by exerting a compressive strain on the prod, the prod being made in two or more sections telescopically interconnected and provided with mechanism that converts the reciprocating motion of the prod parts into rotary motion of a magneto field.

Another object of this invention is to produce an animal prod of the type indicated that shall be so constructed that the magnets, by means of which the high tension current is produced, will retain their strength for a very long period of time.

Another object is to produce a construction in which the rotor of the magneto is operated by a rack and pinion mechanism in combination with a gear train and in which the rack is guided in its movement by means of a channel which retains the parts in operative position.

Another object of the invention is to produce a construction in which the parts are so designed and inter-related that the prod can be readily assembled and disassembled.

A further object is to produce a device of the kind specified in which the parts are of simple and substantial construction and which does not require expensive tools for the manufacturer.

The above and other objects that may become apparent as the description proceeds are attained by means of a construction and an arrangement of parts that will now be described in detail and for this purpose reference will be had to the accompanying drawing in which the invention has been illustrated in its preferred form, and in which.

Figure 1:
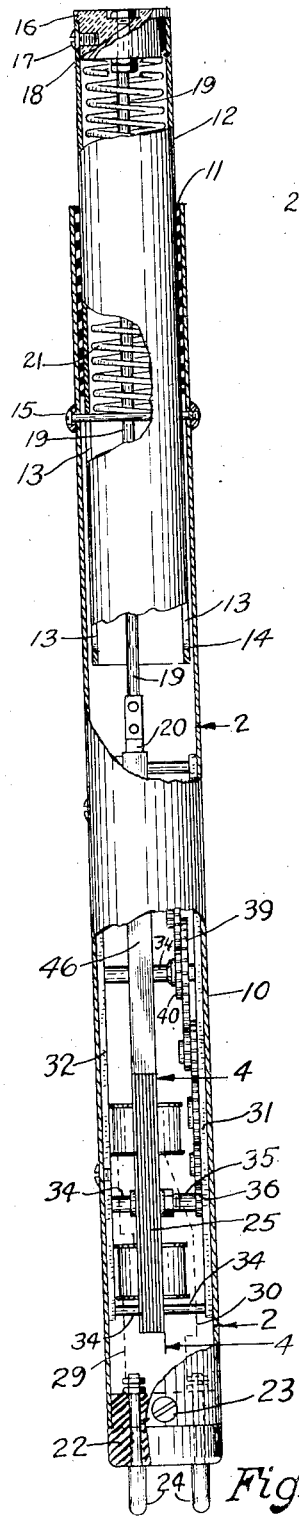
Figure 1 is a view showing the prod housing in diametrical section, a portion being shown in elevation.

In the drawing reference numeral 10 designates a metal tube formed preferably from aluminum. In the actual device, tube 10 has an inside diameter of one and nine sixteenths of an inch and a thickness of one thirty-second of an inch, but it may be made larger or smaller than this, as the size is not critical.

The lower end, when viewed as in Figure 1, will be referred to as the distal end and the upper end as the proximal. The proximal end of tube 10 has an inner lining 11 of some insulating material, such as fiber or hard rubber. The insulating properties of this material has no particular function in the construction shown. Telescoping within tube 11 is another section of tubing that has been designated by reference numeral 12. Its diameter is such that it will have an easy sliding fit in tube 11. Tube 12 is provided with an elongated slot 13 that terminates near its inner end at the point indicated by 14. A screw or rivet 15 extends diametrically through tube 10 and through the opposed slots 13. This screw forms a limit stop that governs the extent of the telescopic action. The upper end of tube 12 is provided with a plug 16 that has been shown as made from vitreous material, but it may be made from any suitable material, including metal. Plug 16 is held in place by means of a screw 17 and has an axial opening 18 for the reception of the end of a bar 19 to the lower end of which rack 20 is connected. A spring 21 surrounds bar 19 and one end of this spring abuts the screw 15 or some other suitable abutment that performs the same function. The other end engages the inner end of plug 16. Spring 21 is always under compression and in the relationship of the parts shown in Figure 1, spring 21 is under maximum compression, the upper end of slots 13 being in engagement with screw 15.

Secured in the distal or lower end of the prod as viewed in the drawing, is a plug 22 of insulating material. This is held in place by means of one or more screws 23. Two electrodes 24 extend through plug 22 and terminate in rounded points as shown in Figure 1. Electrodes 24 are intended to engage the hide of the animal and are rounded so as not to injure the animal.

Figure 3:
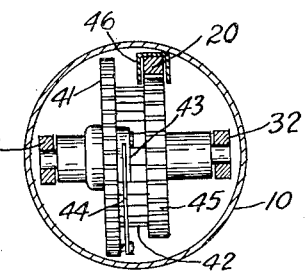
Figure 3 is a section taken on line 3—3, Figure 2.
Figure 4:
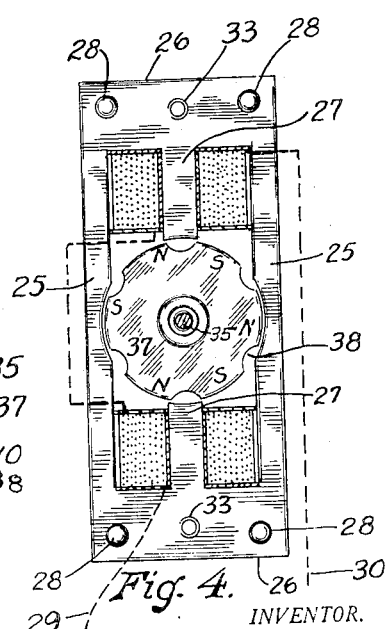
Figure 4 is a view of the magneto taken on line 4—4, Figure 1.

Positioned within the tube 10, nears its distal end, is a magneto. This has been shown in greater detail in Figure 4, from which it will be seen that it consists of a frame of elongated rectangular shape, whose sides have been designated by reference numeral 25, and whose ends are designated by reference numeral 26. The magnet frame is preferably constructed from the laminations of soft iron or steel and the end members are provided with inwardly extending cores 27. The laminations are held in assembled relation by means of rivets 28. On each core is positioned a coil of wire. These coils are wound of very fine insulated wire, preferably of a gauge not greater than 40 and each coil consists of at least 13,000 turns. The coils are so wound that the inner end of one coil will connect with the outer end of the other coil. The other ends of the coils are connected to electrodes 24 by means of conductors 29 and 30. The electromagnet frame is positioned between two flat bars like those designated by reference numerals 31 and 32. These are preferably secured to the magnet by means of rivets passing through openings 33, suitable spacers like those designated by reference numeral 34 being provided between the magnet frame 25 and bars 31 and 32. Journaled in suitable bearings in bars 31 and 32 is a rotary shaft 35 that carries a pinion 36. A circular magnet 37 of a material known in the trade by the name of Alnico No. 5, is secured to shaft 35. The actual composition of this alloy is not known, but magnets constructed of this material can be made much more powerful than when ordinary steel is used. The circular magnet is provided with a number of indentations like those designated by reference numeral 38. In the drawing such indentations have been shown. The magnet is magnetized in such a way that the poles are alternated north and south as indicated in Figure 4. Positioned between bars 31 and 32 is a gear train comprising a number of gears, each one of which has a large gear like that designated by reference numeral 39 and a smaller gear or pinion designated by reference numeral 40. These gears are arranged in the manner shown and in such a way that when the upper gear is rotated at a given speed, the rotor of the magneto will be rotated at a much higher speed. The upper gear has been designated by reference numeral 41 and instead of having a smaller gear attached thereto, is provided with a ratchet wheel 42 that is mounted for rotation relative thereto. Gear 41 carries a pawl like that designated by reference numeral 43 and this is engaged by a spring 44 that urges the pawl into engagement with the ratchet teeth. Ratchet wheel 42 is connected with a spur gear 45 that is engaged by the rack 20. Rack 20 is slidable in and guided by a channel like that designated by reference numeral 46 in Figure 3. As before pointed out, rack 20 is connected with the inner end of rod 19 and therefore when tube 12 is telescoped relative to tube 11, it will impart a corresponding movement to the rack. The ratchet mechanism is so constructed that when rack 20 moves inwardly in the directing of the arrow in Figure 2, the rotation of spur gear 45 will effect a corresponding rotation of gear 41 and this, in turn, will transmit motion through the gear train to the rotatable magnet. In the actual construction this gear ratio is 13 to 1, but may differ from this to any extent found necessary or desirable.

Special attention is called to the guide 46 that controls the position of the rack. This is an important element in the construction because with this guide, the rack is always properly positioned with respect to the gear wheel with which it is associated.

Figure 2:
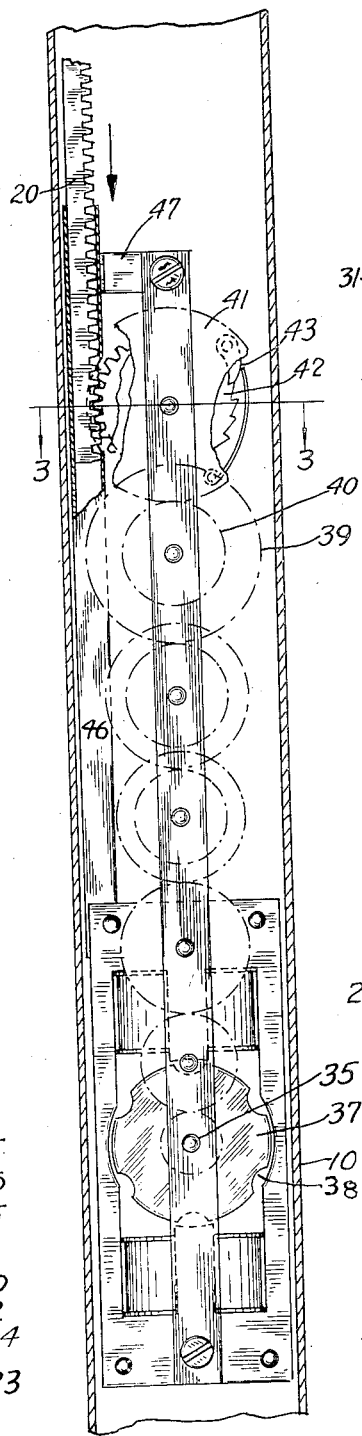
Figure 2 is a view taken on line 2—2, Figure 1, the housing being shown in diametrical section.

Attention is also called to the fact that the guide is connected with the bars 31 and 32 by means of a strut 47 at the upper end, the lower end of channel 46 being connected with the magnet as shown in Figure 2. The channel, therefore, forms part of the magneto assembly with the result that the position of the rack with respect to the gear 45 is always constant.

Attention is also directed to the circular magnet 37 which, instead of being constructed as is usual from bar magnets angularly spaced, is merely provided with notches 38 and magnetized so as to form the polar arrangement shown in Figure 4.

Let us now assume that the prod is constructed in the manner shown and described and that the distal end is positioned against an animal with the electrodes 24 contacting the outer surface of its hide and that pressure is then exerted on tube 12, sufficiently to compress the spring and move the rack inwardly with respect to gear wheel 45. This inward movement of the rack sets the gear train in motion and imparts a sudden and fast rotation to the permanent magnet 37. The quick variation in the number of magnetic lines passing around the magnet coils sets up a high electromotive force that causes an electric shock to be imparted to the animal. This shock, although sufficient to cause the animal to move, is not injurious as it does not penetrate the body of the animal to any appreciable extent, but is confined almost wholly to the hide.

Having described the invention what is claimed as new is:

1. A magneto generator with manual operating means, comprising a tubular base forming a magneto support, an open, elongated, substantially rectangular soft steel frame having aligned poles projecting inwardly from the short ends thereof, the distance between the ends of the poles being substantially equal to the distance between the sides of the frame, coils of insulated wire on the poles, a substantially cylindrical permanent magnet mounted for rotation in the plane of the frame, the peripherial surface of the magnet having an even number of notches, the portions between the notches being magnetized to form alternately north and south poles, one end of the tubular base having a plug of insulating material secured therein, two electrodes embedded in the plug, the electrodes projecting from the plug, conductors connecting the electrodes and the coils in series, means for turning the permanent magnet comprising a train of gears arranged for speed multiplication, the gear at one end of the train being operatively connected with the cylindrical magnet to rotate the latter, the gear at the other end being mounted for free rotation, a pinion mounted for rotation on an axis coincident with the axis of the freely rotatable gear, a ratchet mechanism between the pinion and the last mentioned gear, and means for turning the pinion comprising a rack operatively connected therewith, and manually operable means for reciprocating the rack.

2. A manually operable magneto for use with an animal prod, comprising a tubular base, an open magnet frame of elongated rectangular construction positioned in the base, said frame having aligned cores extending inwardly from the ends thereof, the distance between the ends of the cores being substantially the same as the distance between the inner surfaces of the sides, a cylindrical permanent magnet mounted for rotation about an axis positioned at the center point between the core ends and between the sides, the periphery of said magnet being divided into an equal number of pole pieces by notches, coils of wire on the cores and means for rotating the cylindrical magnet to induce an electromotive force in the coils comprising, a tubular handle telescopically connected with the tubular base, means limiting the telescopic movement in both directions, means comprising a helical compression spring for holding the telescopic parts in extended position, a toothed rack secured to the tubular handle portion, and means for rotating the cylindrical magnet at a high speed when the handle is reciprocated, comprising a train of gears having one of the end gears in geared connection with the cylindrical magnet, the gear at the other end being operatively connected with the rack, whereby when the rack is reciprocated the cylindrical magnet will be rotated, the gears being so designed and connected that the cylindrical magnet will rotate much faster than the wheel connected with the rack.

3. A magneto for use in an electrical animal prod of the type having a tubular base, a tubular handle telescopically connected with one end of the base, means for limiting the relative longitudinal movement of the two tubular members, and a spring for normally holding the members in extended position, said magneto comprising, an open soft steel frame of elongated rectangular shape, the ends of the frame having inwardly extending magnet cores, each containing a coil of fine insulated wire, the distance between the adjacent ends of the cores being substantially equal to the distance between the sides, a cylindrical permanent magnet mounted for rotation about an axis perpendicular to the plane of the frame, the periphery of the cylindrical magnet being separated into an even number of poles by means of notches, the poles being alternately north and south, a toothed rack connected with the tubular handle for reciprocation relative to the tubular base and the magneto, a spur pinion connected with the cylindrical magnet, and means comprising an elongated gear train positioned between the spur pinion on the cylindrical magnet and the rack for rotating the magnet when the rack is reciprocated, whereby an electrical potential is generated in the coils.

4. An animal prod pole comprising, an elongated tubular member having a pair of electrodes extending beyond one end thereof, an operating handle telescopically arranged relative thereto and extending beyond the other end, a magneto within said tubular member having field coils wound about an axis extending longitudinally of said tubular member, and a permanent magnet armature mounted for rotation about an axis transverse thereto, means operably connecting the armature and handle in a manner such that movement of the latter relative to said tubular member rotates the former, and conductors connecting ends of the field coils to the electrodes.

5. An animal prod pole in accordance with claim 4 wherein said means includes a train of gears rotatable about axes parallel to the armature axis.

6. An animal prod in accordance with claim 4 wherein said means includes a rectilinearly movable rack.

7. An animal prod in accordance with claim 4 wherein said means includes a train of gears rotatable about axes parallel to the armature axis, and a rectilinearly movable rack.

MAX FISCHER.

REFERENCES CITED

The following references are of record in the file of this patent:

UNITED STATES PATENTS

| Number    | Name      | Date           |
|-----------|-----------|----------------|
| 427,549   | Burton    | May 13, 1890   |
| 1,209,932 | Bradley   | Dec. 26, 1916  |
| 2,173,282 | List      | Sept. 19, 1939 |
| 2,247,901 | Alexander | July 1, 1941   |
| 2,390,877 | Fisher    | Dec. 11, 1945  |